United States Patent [19]

Woodward

[11] Patent Number: 4,549,310

[45] Date of Patent: Oct. 22, 1985

[54] CROSS-POLARIZATION CORRECTOR FOR CIRCULAR WAVEGUIDE

[75] Inventor: Oakley M. Woodward, Princeton, N.J.

[73] Assignee: RCA Corporation, Princeton, N.J.

[21] Appl. No.: 594,824

[22] Filed: Mar. 29, 1984

[51] Int. Cl.[4] .......................... H04B 1/04; H01P 1/16

[52] U.S. Cl. ................................ 455/129; 333/21 A; 333/251; 343/890

[58] Field of Search .................. 333/21 R, 21 A, 251, 333/239, 242; 343/756, 890; 455/129; 358/186

[56] References Cited

U.S. PATENT DOCUMENTS

| | | | |
|---|---|---|---|
| 2,607,849 | 8/1952 | Purcell et al. . | |
| 2,981,906 | 4/1961 | Turner . | |
| 3,516,032 | 6/1970 | Wernli . | |
| 3,656,070 | 4/1972 | Monaghan et al. | 333/21 A |
| 3,678,420 | 7/1972 | Alsberg | 333/251 X |
| 3,697,898 | 10/1972 | Blackier et al. . | |
| 4,100,514 | 7/1978 | DiTullio et al. . | |
| 4,305,051 | 12/1981 | Hai . | |
| 4,375,052 | 2/1983 | Anderson . | |

*Primary Examiner*—Paul Gensler

*Attorney, Agent, or Firm*—E. M. Whitacre; W. H. Meise; T. H. Magee

[57] ABSTRACT

A UHF broadcast antenna system uses circular waveguide for the run from the high-power final amplifier to the antenna. Undesired cross-polarization components are formed in the circular waveguide due to unavoidable tolerances. Correction of the cross-polarization components is accomplished by a correction apparatus for sampling the principal polarization-plane signal, and reinjecting the sample with controlled amplitude and phase into the circular waveguide in the plane of the cross-polarization component for cancelling the cross-polarization.

11 Claims, 20 Drawing Figures

CROSS-POLARIZATION CORRECTOR FOR CIRCULAR WAVEGUIDE

This invention relates to an arrangement for correcting for cross-polarization components in a circular waveguide which finds use in television broadcast transmitter applications.

Television terrestial broadcasters use VHF frequencies in the range of 50–200 MHz and UHF frequencies in the range of 450–900 MHz as carriers for broadcasting television signals to television receivers within a certain area surrounding a transmitting site. Generally speaking, the broadcaster wishes to reach as many television receivers surrounding his transmitter site as is possible to reach within the limits of the allowable transmitter power and the economics of the transmitting power and antenna. Within certain limits, the broadcast coverage or number of receivers reached can be increased by increasing the transmitter power. However, transmitter power requires a continuing expenditure for electricity to run the transmitter, is limited beyond a certain level by the types of transmitter tubes available, and in any case may be limited by regulatory authority. Another way to increase the coverage is by increasing the gain of the transmitting antenna in the desired direction. As is known, the gain of an antenna is calculated by reference to a theoretical isotropic source transmitter which radiates with equal energy in all directions, and therefore a relative gain in a particular desired direction is accompanied only at the expense of a reduced gain in another direction. Generally speaking, a television broacaster is interested in the area surrounding his transmitter site, and therefore the transmitting antenna is ordinarily designed to be omnidirectional in the azimuth direction. For certain specialized conditions, other antenna patterns may be desirable, as for example, near a coastline, where there is no advantage to radiating energy out of sea. In order to have high gain on the horizon, the antenna is arranged to have very little gain in the zenith directions and for directions other than the horizontal or close to the horizontal. Such an antenna has a radiation pattern in the elevation plane which has a narrow main beam of radiation in the horizontal direction. An upper limit of gain on the horizon is reached due to the large size of the antenna required to achieve high gain, and because narrow beam widths which are associated with high gain eventually become so narrow that slight movement of the antenna in the wind may cause fading of the signal at certain locations.

Since the carrier frequencies for television tend to be line-of-sight (that is, the radial waves act more like light waves in going directly to the receiver without curving about the earth), the television broadcaster normally places the broadcast antenna at the top of a tall tower. The taller the tower, the larger the area covered by direct line-of-sight transmissions. Tower height also reaches a limiting condition at which the incremental cost of increasing the structure to achieve greater height is not economical. An antenna tower height may be limited by regulatory authority for the protection of aircraft.

With the antenna located at the top of a tower which may be 1,000 to 2,000 feet tall, and the source of high-power television signals (transmitter) necessarily located on the ground because of its size, weight and the like, it becomes necessary to carry high-power television signals in the VHF and UHF frequency ranges from the transmitter to the antenna feed point. At the carrier frequencies in question, signals are ordinarily carried by systems of conductors termed transmission lines, which are sets of conductors which are designed to minimize losses between a source and a load by maintaining an impedance match substantially equal to that of the source and load. Transmission lines having such desirable characteristics include two-wire transmission lines, which consist of two equal-diameter conductors having a constant spacing (although various spacers and supports may be required in order to form a practical system) in which the constant spacing and diameter of the wires maintains a constant impedance selected to achieve the desired low transmission loss effect. Two-wire transmission lines are not very satisfactory for use for broadcast transmitters, because the desirable constant impedance is adversely affected by any surrounding structure, because surrounding conductors or non-conductors having a dielectric constant greater than unity perturb the electromagnetic fields surrounding the two wires of the transmission line and thereby cause loss-causing reflections.

Coaxial transmission lines are often used for broadcast transmitter-antenna applications, because the coaxial transmission line is not affected by the environment, it can be sealed against the weather, and it has a very low wind loading, which is desirable for use in very tall towers subject to high winds.

Rectangular waveguides are desirable because of their very low loss compared with coaxial transmission lines, which advantage is more pronounced at UHF frequencies, but is not often used for broadcast transmitter-antenna applications because of its very high wind loading.

Circular waveguide is also very desirable for television broadcast applications, because its loss is extremely low by comparison with that of coaxial transmission line, it can be sealed against the weather, it has high-power handling capability and is relatively inexpensive because of its construction as nothing more than a hollow conductive tube. A disadvantage of circular waveguide lies in its relatively high wind loading by comparison with coaxial transmission line, but the wind loading of circular waveguide is less than for rectangular waveguide. Another disadvantage of circular waveguide is the problem of generation of cross-polarization components due to unavoidable slight asymmetries of the waveguide. The generation of cross-polarization components is undesirable for several reasons. A cross-polarization component effectively swings the principal plane of polarization of the electromagnetic energy propagating therethrough from the desired plane to a plane intermediate between the desired plane and the plane of the cross-polarization component. If an electric probe or magnetic loop is coupled to the load side of the waveguide to couple energy therefrom, rotation of the polarization plane results in reduction of the power available to be coupled to the load, and also results in reflection of the remainder of the power not coupled to the load back to the source. At the source, this power can create power dissipation problems and overheating, or in extreme cases voltage breakdown and destruction of the equipment. In a circular waveguide simultaneously carrying two circular-polarization components of opposite hand, cross-polarization components may cause interaction.

It is known to correct cross-polarization components by an experimental technique involving striking the side of the circular waveguide with a hammer to dimple the waveguide, thereby rotating the plane of the cross-polarization components in a desired direction, for reducing their magnitude. However, for television broadcast applications this is not a suitable technique because the dimples, if placed in the wrong location, cannot be removed, and the waveguide is too expensive to throw away and start again. It is also known to correct cross-polarization in circular waveguides by placing clamps around the periphery of the waveguide and adjusting the tightness of the clamps in such a fashion as to warp the cross-section of the waveguide and thereby correct the cross-polarization. This method is satisfactory but may not provide enough correction of amplitude and phase without exceeding the yield point of the outer conductor and thereby introduce a dimple, and also may loosen or change as a function of temperature as materials expand and contract, and thereby require frequent readjustment. In any case, the clamp method requires skill and judgment beyond that of the ordinary technician. A method is desired for correcting cross-polarization which gives a broad range of adjustment, can be readjusted easily if necessary by technicians of ordinary skill, and which may be sealed in order to pressurize the waveguide for protection against the elements.

SUMMARY OF THE INVENTION

Cross polarization in a circular waveguide is corrected by a narrow rectangular waveguide coupled through the side of the circular waveguide and having a coaxial probe therethrough protruding into the circular waveguide in order to sample signal therefrom and to propagate that signal into the rectangular waveguide. The coaxial conductor is shorted a fraction of a wavelength into the rectangular waveguide. A probe coupled to the coaxial conductor produces a signal which propagates back to the juncture of the rectangular and circular guides with an electric field at right-angles to the field sampled by the probe for adding to the cross-polarization component.

DESCRIPTION OF THE INVENTION

Figure 1:
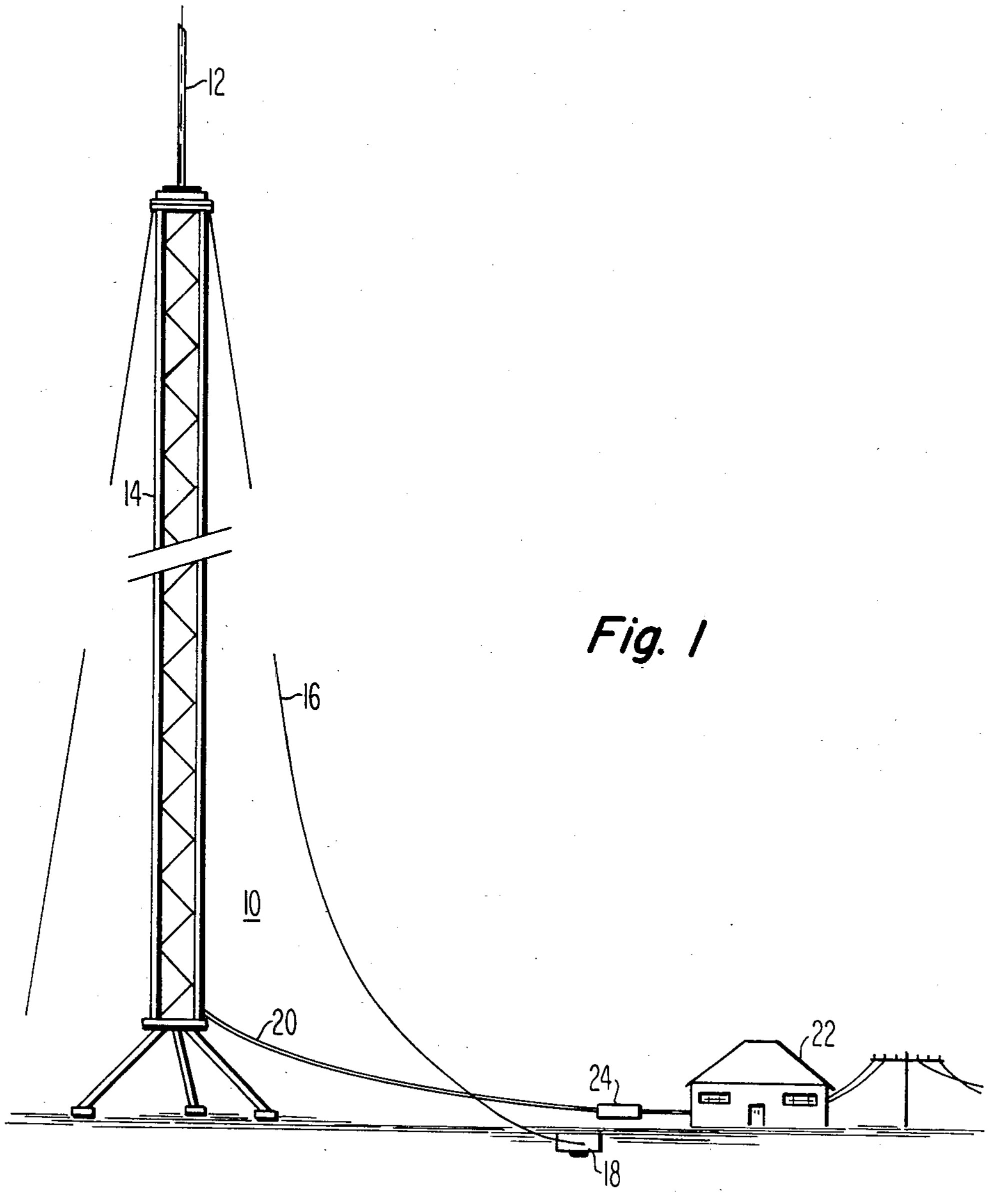
FIG. 1 illustrates generally a broadcast transmitter, tower and antenna with a circular waveguide feed.

In FIG. 1, 10 designates generally a television broadcasting system including an antenna 12 illustrated as being a slotted pylon antenna mounted on a supporting tower 14 having guywires for withstanding lateral forces, the guywires 16 being attached to anchors 18 (only one illustrated). A circular waveguide 20 runs from a building 22 housing a high-power television signal generator (not illustrated) up the inside or outside of tower 14 to feed antenna 12. A cross-polarization corrector 24 is illustrated as being coupled to waveguide 20 for reducing cross-polarization components which are unavoidably generated in circular waveguide 20 due to slight variations in cross section, conductivity of the walls and the like.

Figure 2A:
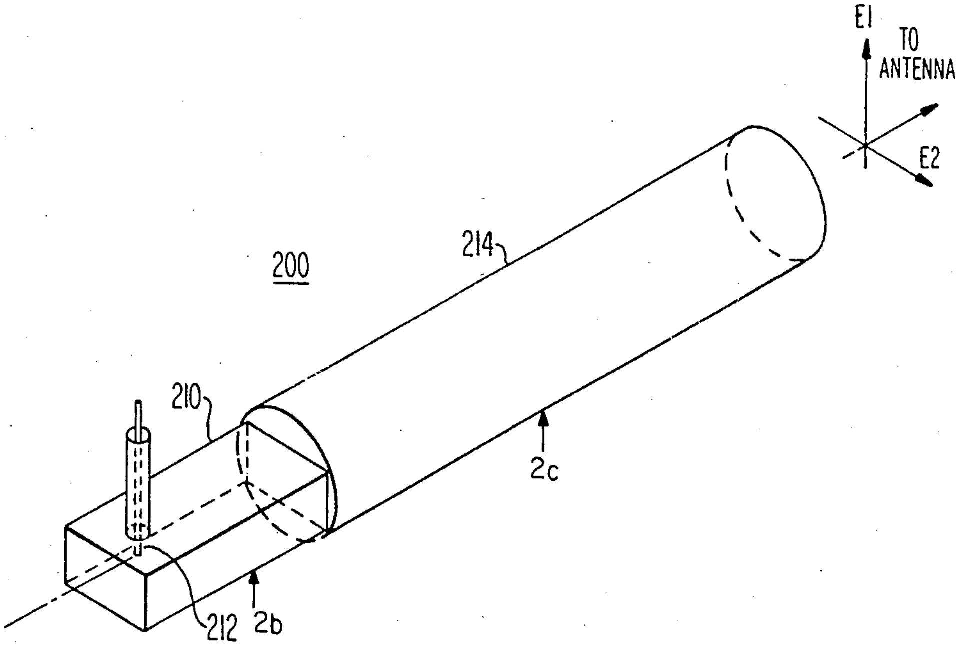
Fig. 2a PRIOR ART
FIGS. 2*a* through 2*c* illustrates a rectangular-to-circular waveguide transition and also illustrate the field structure for the dominant propagating modes therein.
Figure 2B:
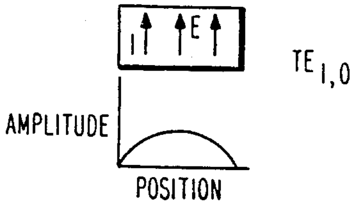
Figure 2C:
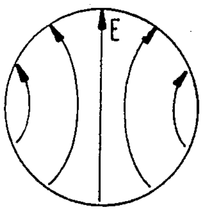

FIG. 2*a* illustrates a rectangular-to-circular waveguide transition as known in the prior art. A $TE_{1,0}$ mode signal illustration in FIG. 2*b*, is generated in rectangular waveguide section 210 by a probe illustrated as 212 driven from a source of signals. The electric wave propagates into the circular portion of the waveguide with the same orientation which it had in the rectangular waveguide, propagating in a mode known as the $TE_{11}$ mode, and induces electric field E, illustrated in FIG. 2*c*, into the circular waveguide.

Figure 3A:
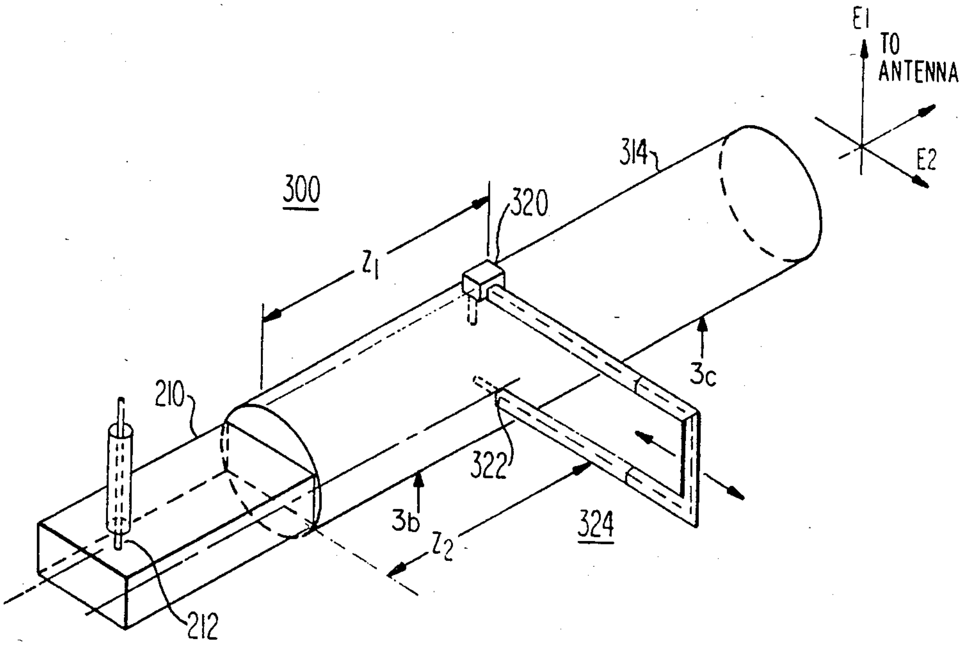
FIGS. 3*a* through 3*c* illustrate a waveguide section including an apparatus according to one embodiment of the invention for using cross-polarization components, and also illustrate the field structures in the circular waveguide.
Figure 3B:
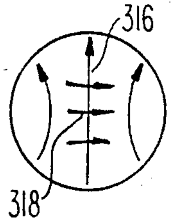
Figure 3C:
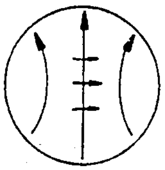

FIG. 3*a* illustrates the rectangular-to-circular waveguide adaptor of FIG. 2*a* including a cross polarization corrector in accordance with one embodiment of the invention. Rectangular waveguide section 210 is illustrated solely to show how the electric fields are oriented, and has no part in this invention. In FIG. 3*b*, the electric field induced into circular waveguide section 314 at a location near the junction is illustrated as having a principal electrical field designated as 316 and a cross-polarization component illustrated as 318. Fields 316 and 318 are illustrated as existing at the junction location only for ease of understanding; the cross-polarization components may arise at any point along the entire length (up to 2000 feet) of the circular waveguide, and after correction by the invention, illustrated by the electric field in FIG. 3*c*, may not exist at any point. An adjustable arrangement of a pickup coupler 320 and a second coupler 322 having orthogonal placements in circular waveguide section 314 are illustrated as being coupled together by an adjustable sliding or "trombone" section of coaxial line designated generally as 324.

Figure 4B:
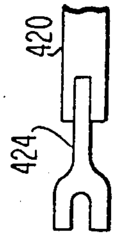
FIG. 4*b* is a top view of a connector disposed therein.
Figure 4A:
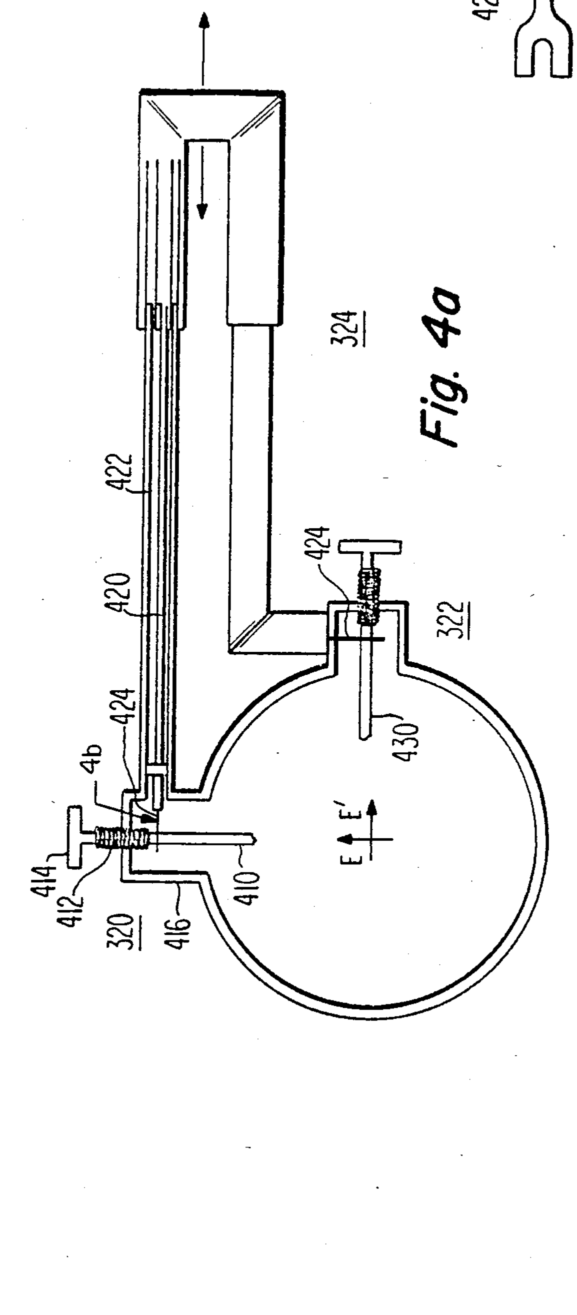
FIG. 4*a* illustrates a cross-section of the apparatus of FIG. 3*a*.

FIG. 4*a* illustrates details of the cross-polarization corrector of FIG. 3*a*. In FIG. 4*a*, a probe assembly 320 coupled in or near the principal plane of polarization designated by the arrow E includes a probe designated 410 which is adjustable in depth for sampling a greater or lesser proportion of the principal polarization signal by means of a nonconductive screw section 412 connected to conductive probe 410. A handle 414 allows the screw to be turned relative to housing 416. A sliding connection to the center conductor 420 of a coaxial transmission line section 422 which is a part of trombone section 324 is accomplished by means of a forked connector portion 424 soldered to center conductor 420, as illustrated in FIG. 4*b*. Probe assembly 322 has generally the same construction, and the other end of the center conductor 420 of the coaxial transmission line 324 is coupled thereto, by means of another forked connector portion 424, for transferring energy from probe 410 to probe 430. In this way, probe 430 couples into the circular waveguide an electric field component designated E' with an amplitude controlled by the depth of penetration of probes 410 and 430, and with a phase controlled by the positioning of sliding trombone coaxial conductor 324. The phase and amplitude are adjusted to correct the cross-polarization component by reducing it towards zero. While large reductions in amplitude are possible, in general the cross-polarization components cannot be completely eliminated, since some adjustment error will invariably occur, and because the magnitude of the cancelling field will vary slightly as a result of temperature and other variations. It should be noted that the correction fields propagate in both directions along the circular waveguide from the corrector, and cancellation of the cross-polarization components may take place along the length of the circular waveguide.

Figure 5A:
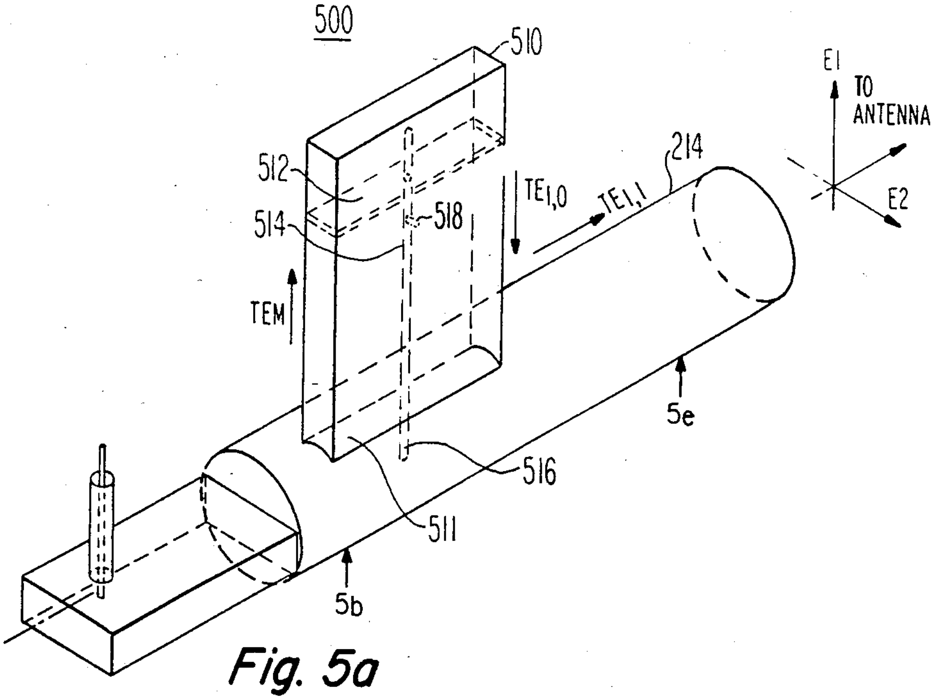
FIGS. 5*a* through 5*e* and 6 illustrate a second embodiment of an apparatus according to the invention for reducing cross-polarization components, together with illustrations of the field structure at various points in the arrangement.

FIG. 5*a* illustrates a circular-to-rectangular transition including a cross-polarization corrector 500 according to another embodiment of the invention. In FIG. 5*a*, a rectangular waveguide designated 510 includes a sliding short-circuit 512 and a central conductor 514 with a portion 516 which protrudes into circular waveguide 214 to probe the principal electric field. A mode converter illustrated as a probe 518 is coupled to conductor 514 at a high-voltage point approximately one-quarter wavelength from short-circuit 512.

Figure 5B:
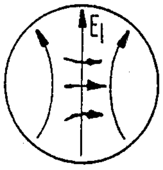
Figure 5E:
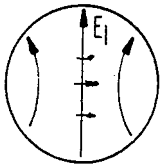
Figure 5C:
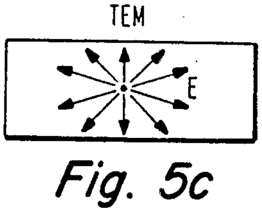
Figure 5D:
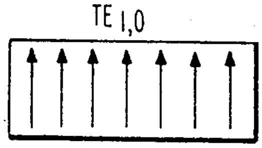

In operation, the portion 516 samples the principal-polarization component of the electric field propagating through waveguide 214 illustrated in FIG. 5*b* and couples it into waveguide 510 in a TEM mode, illustrated in FIG. 5*c*, with the conductor 514 coacting with the wide walls of waveguide 510 in a manner similar to a coaxial line or a parallel-plate strip line of the type known as TRIPLATE. The energy coupled into and propagating in a TEM mode upward in waveguide section 510 is intercepted by short-circuit 512 thereby creating at the position of a short-circuit 512 a high-current low-voltage condition. A quarter-wavelength towards slot 511 from short-circuit 512 a low-current, high-voltage condition exists, and mode converter or probe 518 samples the TEM wave at this location to generate dominant waveguide-mode $TE_{10}$, which has the electric field configuration illustrated in FIG. 5*d*. The electric field of the $TE_{10}$ is transverse to the wide walls of waveguide 510, so that when the electric field is coupled into circular waveguide 214 it has a polarization such as that illustrated as E2, orthogonal to E1. The magnitude of the E2 component coupled into waveguide 214 by cross-polarization corrector 500 is adjusted by the depth of penetration of the portion 516 into waveguide 214 for sampling principal electric field E1. The phase of the cross-polarization correction signal E2 is controlled by the positioning of waveguide short-circuit 512. FIG. 5*e* illustrates the corrected electric field propagating through the waveguide 214. Thus, the amplitude of signal E2 and its electrical phase relative to E1 can be controlled by control of the position of conductor 514 and associated portion 516 and by adjustment of the short circuit 512. For this purpose, the position of the conductor should be adjustable relative to the position of the short-circuit.

Figure 6:
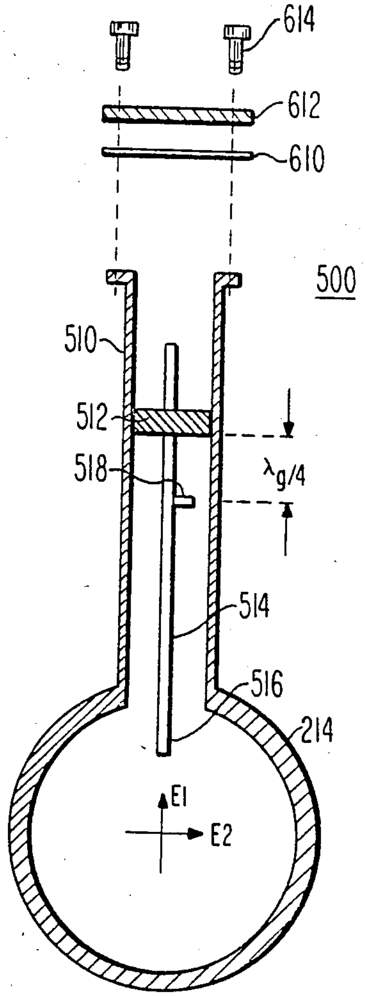

FIG. 6 illustrates in cross-sectional view the arrangement of cross-polarization corrector 500 including details of a gasket 610, cover plate 612 and screws 614 (only two illustrated) for closing and sealing the end of waveguide section 510 so that the entire system can be pressurized with dry gas in known fashion for preventing voltage breakdown under severe environmental conditions. The central conductor 514 is connected to the sliding short circuit 512 and has the probe 518 coupled thereto and also the portion 516 which protrudes into the circular waveguide 214.

Figure 7:
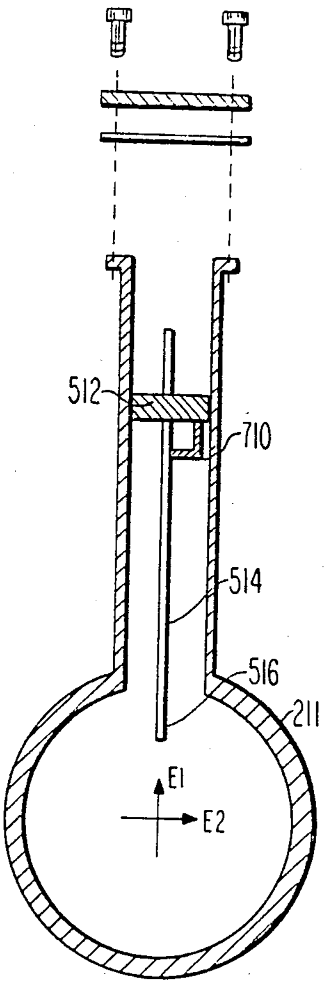
FIG. 7 illustrates a third embodiment of the invention.

FIG. 7 illustrates an arrangement similar to FIG. 6, in which mode converting probe 518 is not used, and in which the mode conversion is accomplished by a magnetic coupling loop 710 coupled to the short-circuit 512 and to conductor 514. Such a magnetic coupling loop may be coupled quite near short-circuit 512, since it principally responds to current rather than to voltage. However, it is more advantageous to form the loop with a portion of the turn nominally 1/4-wavelength from the short-circuit.

Figure 8B:
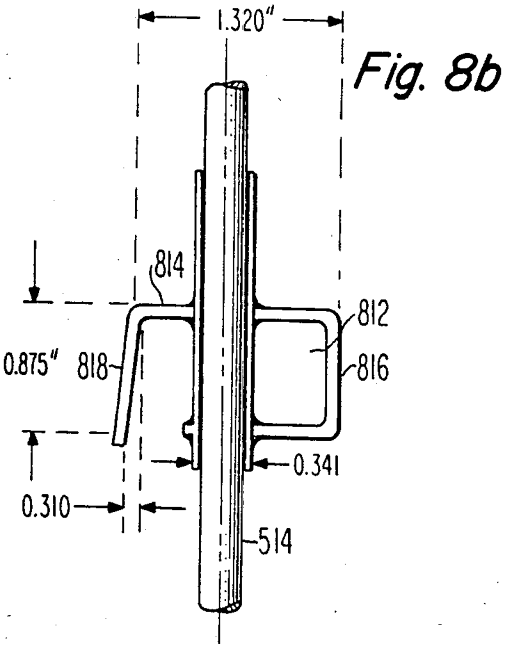
FIGS. 8*a* through 8*d* illustrate in perspective and mutually-orthogonal views a preferred embodiment of a sliding short-circuit for use in the arrangement of FIG. 7.
Figure 8C:
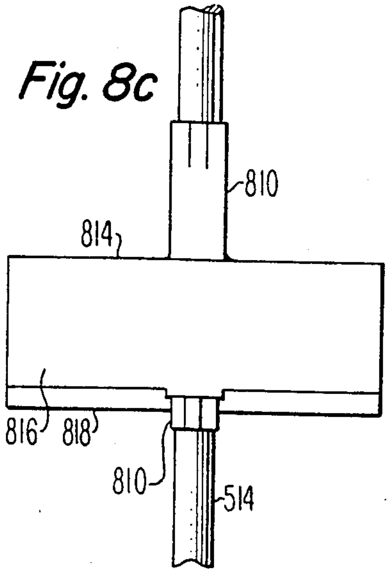
Figure 8D:
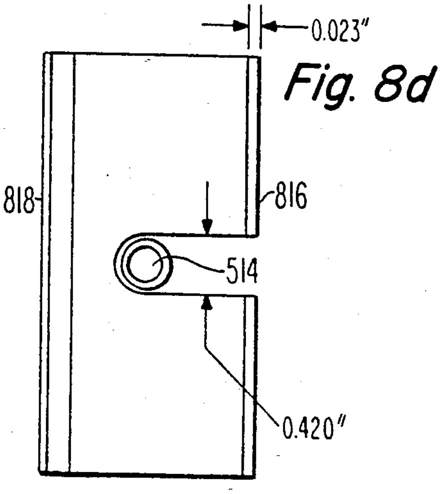
Figure 8A:
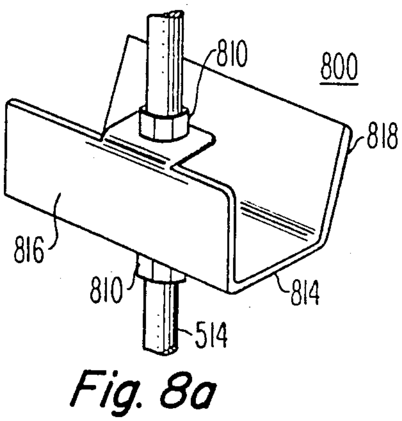

FIGS. 8*a* through **8*d* illustrate a sliding short-circuit coupling-loop combination 800** adapted for use in the arrangement of FIG. 7. FIG. 8*a* is a perspective view, and FIGS. 8*b*, 8*c* and 8*d* are orthogonal projections aiding in understanding the structure. Generally speaking, the sliding short-circuit combination 800 is formed from a single sheet of folded metal together with a slotted tube 810 soldered or brazed thereto, the slots being bent inward to grip conductor 514 firmly to provide good electrical contact. A clamp (not shown) may be used over slotted tube 810 to improve the contact and to fix sliding short-circuit combination 800 in position relative to conductor 514. A coupling loop illustrated as an aperture 812 is formed integrally with the short-circuit combination 800. The plane of the short-circuit is established by end conductor 814 of the structure, while sidewall 816 bears against a broad wall of the waveguide, and sidewall 818 is sprung out slightly to firmly press against the opposite broad sidewall of the waveguide. This arrangement also provides a 4:1 impedance transformation which aids in matching the relatively low-impedance TEM-mode "coaxial" TRIPLATE line to the higher impedance of the $TE_{1O}$ mode in the rectangular waveguide.

A bar (not shown) and fastener may be coupled to the top of conductor 514 at a position between the short circuit and cover plate 612 in order to aid in holding conductor 514 and probe 516 in a desired position. Such arrangements are well known to those skilled in the art and need no further explanation.

For UHF television operation in the range of 470–890 MHz operation is in four ranges. The inner diameter of the circular waveguide for operation in the lower quarter of the 470–890 MHz band should be about $18\frac{5}{8}$ inches, the rectangular waveguide for the cross-polarization corrector of FIGS. 5–8 should be rectangular waveguide having dimensions of $7\frac{3}{4}$ inches by $15\frac{1}{4}$ inches. Conductor 514 may have a diameter of about $2\frac{1}{4}$ inches and the dimensions of short-circuit combination 800 are, as illustrated in FIGS. 8*b* and 8*d*, scaled to fit the rectangular waveguide. Naturally, other dimensions may be more suitable for applications to other frequencies, and for different degrees of correction of cross-polarization.

Other embodiments of the invention will be apparent to those skilled in the art. The cross-polarization corrector may be coupled in any orientation to the circular waveguide or may be used in conjunction with elliptical waveguide. The distance of the cross-polarization corrector (whether of the rectangular-waveguide or trombone-section type) from rectangular waveguide 210 is arbitrary and unrelated to the invention; principal fields may be introduced into circular waveguide by probes without an intervening rectangular-waveguide section 210. The run of waveguide along the ground from the final power amplifier to the base of the tower may be rectangular waveguide, with a transition to circular near the base of the tower; in this case the cross-polarization corrector would be located in the circular waveguide run.

What is claimed is:

1. A transmission line comprising:
circular waveguide means adapted for propagating a signal in the form of a first polarized electromagnetic signal in a longitudinal direction through said waveguide means, said waveguide means having unavoidable size variations which result in undesired generation of a cross-polarization signal which accompanies said first polarized signal;
first coupling means coupled to said circular waveguide means for extracting a sample of said first polarized signal from said waveguide means and producing a sample signal;
second coupling means coupled to said circular waveguide means for coupling to said cross-polarization signal; and
third coupling means coupled to said first and second coupling means for coupling said sample signal to said second coupling means with an amplitude and phase to reduce said cross-polarization signal.

2. A transmission line according to claim 1 wherein said first coupling means comprises a voltage probe.

3. A transmission line according to claim 1 wherein said third coupling means comprises a coaxial transmission line coupled to said first coupling means.

4. A transmission line according to claim 2 wherein said third coupling means comprises a coaxial transmission line coupled to said voltage probe.

5. A transmission line according to claim 1, wherein said first and second coupling means comprise voltage probes.

6. A transmission line according to claim 1 wherein said first coupling means comprises a voltage probe;
said third coupling means comprises a narrow rectangular waveguide through which an extension of said voltage probe extends for coupling energy from said voltage probe into said narrow waveguide; and
said second coupling means comprises a probe coupled to said extension for generating a waveguide-mode signal, and said second coupling means further comprises a junction of said rectangular waveguide with said circular waveguide means for coupling said waveguide-mode signal into said circular waveguide means to cancel said cross-polarization signal.

7. A television broadcasting system, comprising:
a television broadcast antenna;
a tower for supporting said antenna at a height for good line-of-sight operation;
a television broadcast power generator at a distance from the base of said tower for generating television frequency carrier signals for application to said antenna;
a circular waveguide coupled to said antenna and to said generator for providing a low-loss transmission path between said generator and said antenna, said waveguide propagating said carrier signals in a principal polarization, and being subject to generation of undesirable cross-polarization signal components which adversely affect operation of said system;
sampling means coupled to said circular waveguide for sampling said principal polarization of said carrier signals to form sample signals;
means coupled to said circular waveguide for reinserting said sample signals in an amplitude and phase for cancelling a substantial portion of said cross-polarization signal components for improving operation of said system.

8. A polarization corrector for a circular waveguide, comprising:
sampling means coupled to said circular waveguide at a particular radial position for sampling the principal-polarization component of the signal traveling therethrough to produce a sampled signal;
second coupling means coupled to said circular waveguide at a second radial position, which second radial position is approximately 90° removed radially from said particular radial position, whereby said second coupling means is coupled with an undesired low-level cross-polarization component of said signal traveling therethrough; and
third coupling means coupled to said sampling means and to said second coupling means for coupling said sampled signal to said second coupling means for coupling said sampled signal into said circular waveguide at said second radial position with a phase which opposes said cross-polarization component and an amplitude which is substantially equal to that of said cross-polarization component whereby said cross-polarization component is cancelled.

9. A corrector according to claim 8 wherein said sampling means and said second coupling means comprise voltage probes.

10. A corrector according to claim 9 wherein said third coupling means comprises a delay line for phase control.

11. A corrector according to claim 9 wherein said third coupling means comprises penetration adjustment means for said voltage probes for amplitude control.

* * * * *